March 2, 1954 W. L. McCLURE 2,671,057
APPARATUS AND METHOD FOR CONTACTING SOLIDS WITH GASES
Filed Aug. 5, 1949
2 Sheets-Sheet 1

INVENTOR.
WILLIAM L. McCLURE
BY
Busser and Harding
ATTORNEYS

March 2, 1954   W. L. McCLURE   2,671,057
APPARATUS AND METHOD FOR CONTACTING SOLIDS WITH GASES
Filed Aug. 5, 1949   2 Sheets-Sheet 2
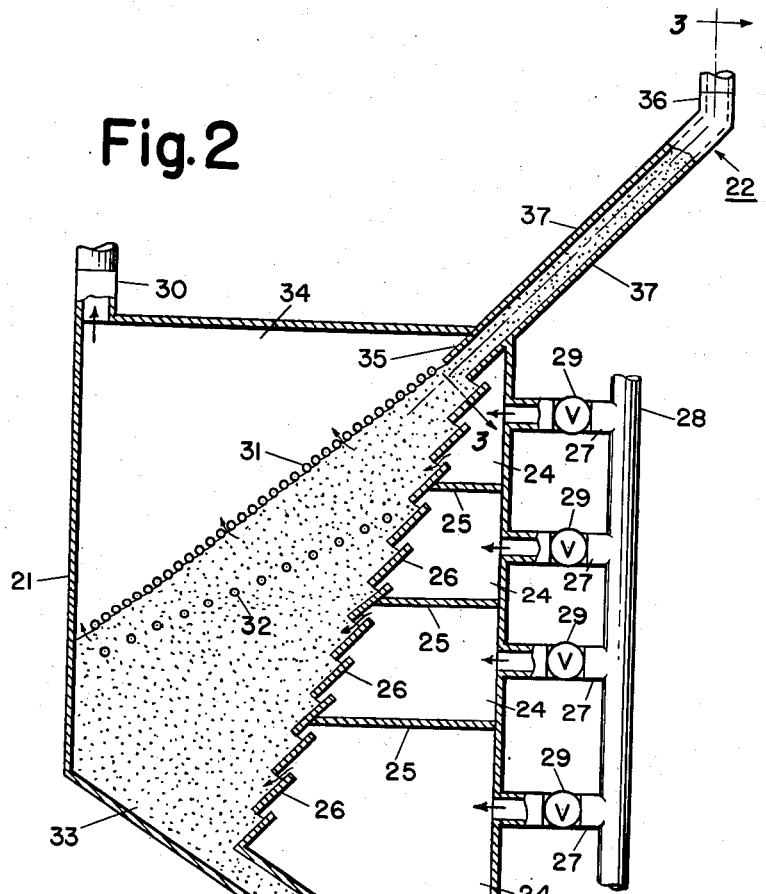
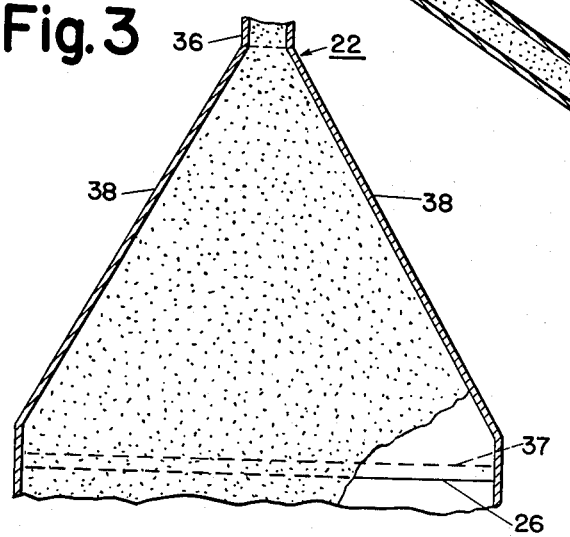
*INVENTOR.*
WILLIAM L. McCLURE
BY
Busser and Harding
ATTORNEYS Patented Mar. 2, 1954

2,671,057

UNITED STATES PATENT OFFICE 2,671,057

APPARATUS AND METHOD FOR CONTACTING SOLIDS WITH GASES

William L. McClure, Arden, Del., assignor to Sun Oil Company, Philadelphia, Pa., a corporation of New Jersey Application August 5, 1949, Serial No. 108,716

16 Claims. (Cl. 252—418)

This invention relates to the intimate contacting of gasiform material with moving particle-form solids. More particularly, it relates to a method and apparatus for effecting a chemical reaction or an adsorptive operation by contacting gasiform material with solid particles moving in a compact bed.

The invention may advantageously be used in cases where the solid particles are catalysts such as are used in catalytic cracking and other catalytic conversions of hydrocarbon oil, for example, hydrogenation, dehydrogenation, aromatization, polymerization, isomerization, reforming, alkylation, or desulfurizing; it may also be advantageously used in cases where the solid particles are heated inert solid particles such as are used in thermal cracking, viscosity breaking, and coking of hydrocarbon oils, or where they are adsorbent particles adapted to remove by adsorption certain constituents of a mixture of gasiform materials.

The invention is particularly advantageous when used in cases where the solid particles have such physical nature that attrition occurring during passage of the particles through the contacting apparatus in a compact bed results in the formation of a substantial amount of solid material having smaller size than the particles as originally introduced into the contacting system. The invention will be described in detail as it relates to catalytic conversion of hydrocarbon oil, wherein the catalyst moves by gravity through alternate zones of reaction with oil vapors and regeneration by burning of carbonaceous deposits from the catalyst in the presence of a free-oxygen containing gas.

Catalysts which are used in the moving bed catalytic conversion of hydrocarbon oil include natural and acid-activated clays and synthetic silica-alumina catalysts, prepared according to methods which are well known in the art. The catalyst particles, as originally prepared and prior to introduction into the system of apparatus wherein the process is effected, generally have a uniform size within the range 4–10 mesh by the standard Tyler scale. As the catalyst moves through the apparatus as a moving bed, attrition of the particles occurs, and smaller particles are formed, so that, after the catalyst has been in the system for a certain length of time, particles ranging in size from 4–10 mesh to 40 mesh and a negligible amount smaller than 40 mesh will be present in the moving bed.

The wide variety of particle sizes resulting from attrition gives rise to certain disadvantages in previous methods and apparatus for moving bed catalytic conversion. The most serious of such disadvantages is attributable to the fact that when a compact bed of solid particles having various sizes moves by gravity in a substantially vertical direction from a relatively constricted region, wherein substantially random distribution of particles according to size prevails, into a relatively expanded region, the distribution of particles according to size becomes less random by virtue of the fact that the particles having relatively larger size tend to concentrate in the peripheral portion of the moving bed. This distribution effect is obtained in the prior art in the feeding of catalysts to a reactor or regenerator; when the catalyst flows from the relatively small feed pipe onto the bed in the vessel, the large particles migrate to the periphery.

This non-random distribution interferes with the uniformity of contact between gasiform material and catalyst, as this contact is conventionally effected in the prior art, because no matter how carefully the gasiform material inlets are distributed over a horizontal cross-section of the contacting apparatus, the gasiform material, in passing through the catalyst bed, will find an easier passage through the peripheral portions of the bed, wherein the larger size particles are relatively concentrated, and will therefore pass through such peripheral portions at a greater rate than through the central portions and cause more rapid and more complete reaction in conjunction with the particles in the peripheral portion. Also, the fact that the larger particles concentrated near the periphery are the more recently added to the system and therefore have higher activity contributes to the intensity of the reaction in the peripheral portion.

In most prior art conversion catalyst regenerators of the moving bed type, the relatively rapid passage of air along the walls of the vessel results in more intense burning and therefore higher temperatures near the wall, a potentially dangerous condition which introduces the possibility of failure of the wall.

The present invention, which overcomes these and other disadvantages of the prior art, will be explained with reference to the attached drawings.

Fig. 2 is a sectional elevational view of a gas-solid contacting vessel, having rectangular horizontal cross-section and being, by virtue of certain other features, particularly well adapted for use as a regenerator in a moving bed catalytic conversion process.

Fig. 3 is an enlarged section taken along the line 3—3 of Fig. 2.

Figure 1:
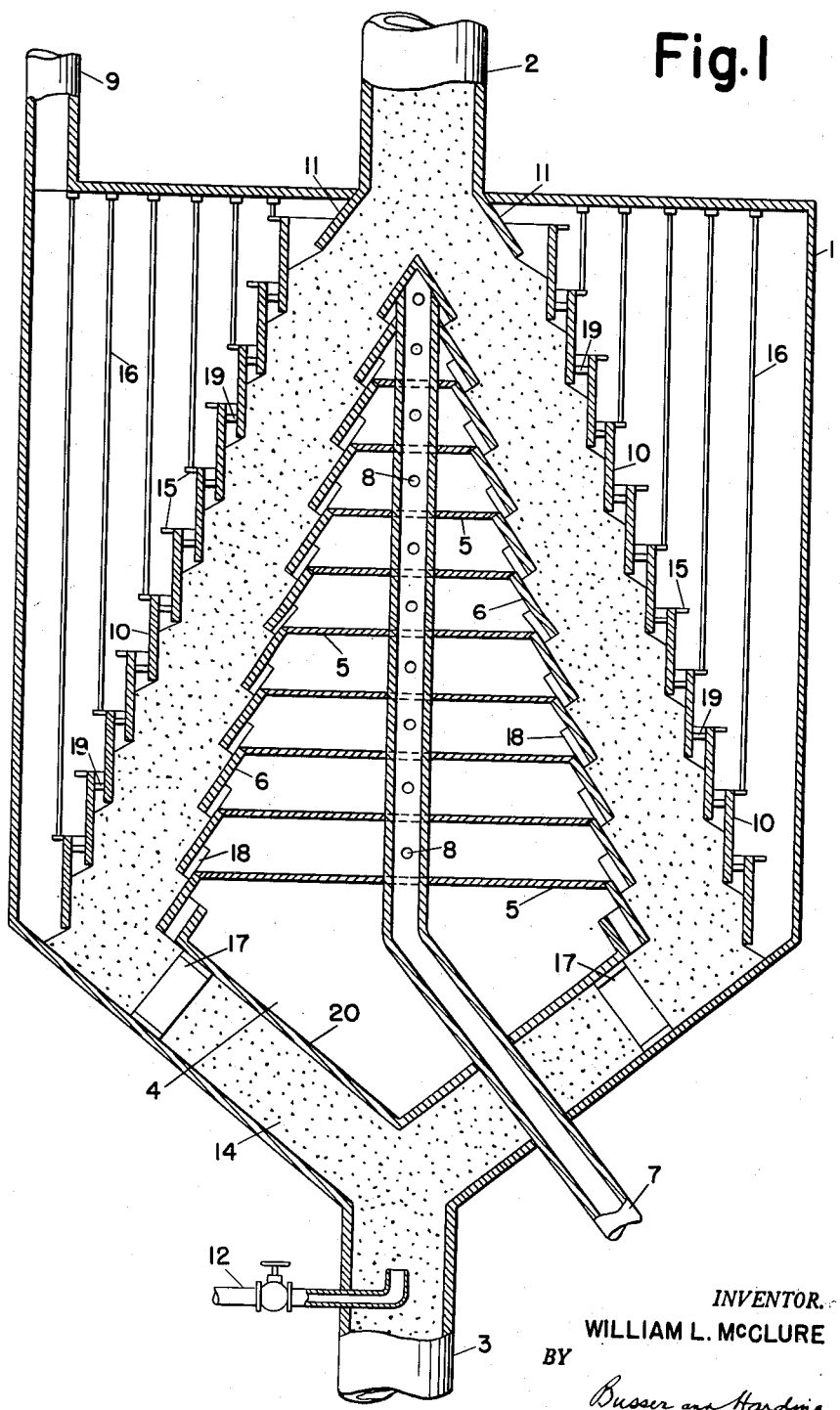
Fig. 1 is a sectional elevational view of a gas-solid contacting vessel, having circular horizontal cross-section and being, by virtue of certain other features, particularly well adapted for use as a reactor in a moving bed catalytic conversion process.

In Fig. 1, a contacting vessel 1 is represented, having at the top thereof an inlet 2 for particle-form solids, and at the bottom thereof an outlet 3 for particle-form solids. Within the vessel 1 are a plurality of vapor chambers 4, separated by partitions 5 and constituting a conical vapor space which is coaxial with inlet 2. An upper boundary of this conical vapor space is formed by a series of louvers 6, connected to the partitions 5. Each louver 6 is angularly disposed in the same direction and supported above the next lower louver by means of spacer supports 18. The bottom member 20 of the lowest of the vapor chambers 4 is secured to the vessel 1 by means of main channel supports 17. The coaxial inlet 2 constitutes means for introducing uniformly, onto the top of the louvered surface of the conical vapor space, catalyst having substantially random distribution according to particle size.

The louvers 6, the lower edges of which extend outwardly away from the vapor chambers 4, constitute a partition having discontinuities adapted to allow the passage of gasiform material therethrough while preventing substantial passage of particle-form solids downwardly therethrough. Such discontinuities are provided, in the embodiment shown in Fig. 1, by spacing apart the louvers 6 in such a way that, in vertical section, a line through the lower edge of one louver, which line extends from that lower edge downwardly and inwardly toward the vapor chambers 4 and forms with the horizontal an angle equal to the static angle of repose of the solids, intersects an adjacent louver.

An inlet tube 7 for gasiform materials communicates through ports 8 with each of the vapor chambers 4. At the top of vessel 1 is an outlet 9 for gasiform materials.

Disposed within the vessel 1 but outside the vapor space is an assembly of baffles 10, which are spaced apart in a manner such that, in vertical section, a line through the lower edge of any of the baffles 10, which line extends from that lower edge downwardly away from the vapor space 4 and forms with the horizontal an angle equal to the static angle of repose of the solids, intersects an adjacent baffle. By so spacing the baffles, solids are prevented from passing upwardly through the surface defined by the baffles, i. e. from beneath that surface to a position above it by surrounding the baffles.

The topmost baffle in the row of baffles 10 is so placed with respect to the skirt 11, which constitutes a part of the solids feeding assembly, that, in vertical section, a line passing through the lower end of skirt 11, which line extends from that lower end downwardly away from the vapor space 4 and forms an angle with the horizontal equal to the static angle of repose of the solids, intersects that topmost baffle.

The baffles 10, the lower edges of which extend inwardly toward vapor chambers 4, constitute a partition having discontinuities adapted to allow passage of gasiform material therethrough, while preventing substantial passage of particle-form solids upwardly therethrough.

The baffles 10 are supported by hanger rods 16, which are spaced apart around the baffles 10 and attached to the flanges 15 on the baffles 10. Each baffle 10 is maintained in spaced apart relation with the adjacent baffles by means of baffle spacer members 19.

Communicating with outlet 3 is an inlet 12 for introducing a purging medium into the solids bed.

When the apparatus of Fig. 1 is used as a reactor in catalytic conversion, the operation is as follows:

Catalyst particles are introduced into reactor 1 through inlet 2, and move downwardly therein in an inclined compact bed over the louvers 6. Inlet 2 discharges uniformly, onto the top of the inclined surface of the conical vapor space, catalyst having substantially random distribution according to particle size. The catalyst leaves the reactor 1 through outlet 3 at a rate regulated by the setting of valve means not shown. The catalyst bed is at all times restricted in its path to the space between the assembly of baffles 10 and the row of louvers 6. The bed is prevented from surrounding the baffles 10 by the fact that, in order to do so, its surface would have to assume an angle less than the static angle of repose of the catalyst. Since, by controlling the rate of gas passage through the bed, the bed surface can be prevented from behaving in such a fashion, the assembly of baffles 10 effectively provides one boundary of the catalyst bed. The louvers 6 are so spaced that they provide an opposite boundary of the bed.

Hydrocarbon vapors are introduced into the vapor chambers 4 through inlet tube 7 and ports 8 and flow through the spaces between the louvers 6 into the catalyst bed 14, where contact between the vapors and catalyst occurs under conditions such that conversion of the vapors occurs. The flow of vapors through the various ports 8 may be controlled by any means known in the art. The vapors flow through the bed 14 in a direction substantially perpendicular to the direction of movement of that bed. Vaporous conversion products disengage from the catalyst bed 14 at the catalyst surfaces between the baffles 10, at the catalyst surface between the topmost baffle and skirt 11, and at the catalyst surface between the lowermost baffle and the wall of the vessel 1, and are withdrawn through outlet 9.

A stripping medium, e. g. steam, is introduced through inlet means 12 into the catalyst mass in outlet 3 and passes upward through the descending catalyst, removing hydrocarbon materials therefrom.

In Fig. 2, a contacting vessel 21 is represented, having at the top thereof an inlet 22 for particle-form solids, and at the bottom thereof an outlet 23 for particle-form solids. Inlet 22 comprises an upper vertical portion 36 and a lower portion, the parallel walls 37 of which are inclined at an angle with the horizontal of about 45°. Within the vessel 21 are a plurality of adjacent vapor chambers 24, separated by partitions 25. An upper boundary of the vapor space formed by the series of vapor chambers 24 is formed by a series of plane louvers 26, some of which are connected to the partitions 25.

Turning now to Fig. 3, the lower portion of inlet 22 is, with respect to upper portion 36 of inlet 22, relatively expanded in one dimension. Downwardly divergent walls 38 of the lower portion define, with the top and bottom of that lower portion, a parallelogram having base angles which are each about 60°. The structure of the lower portion of inlet 22 constitutes means for introducing substantially uniformly, onto the top of the louvered surface of the vapor space, particles having substantially random distribution according to particle size.

Turning again to Fig. 2, the louvers 26, the lower edges of which extend outwardly away from vapor spaces 24, are spaced apart in a manner such that, in vertical section, a line through the lower edge of any louver, which line extends downwardly and inwardly toward the vapor chambers 24 and forms with the horizontal an angle equal to the static angle of repose of the solids, intersects an adjacent louver. Thus the partition constituted by louvers 26 is adapted to allow passage of gasiform material therethrough while preventing substantial passage of particle-form solids downwardly therethrough.

A series of inlet tubes 27 for gasiform material, all supplied from line 28 through valves 29, communicate with each of the vapor spaces 24. At the top of vessel 21 is an outlet 30 for gasiform material.

Disposed within the vessel 21 is an assembly of substantially horizontal heat transfer tubes 31, the axes of which lie in an inclined plane. The tubes 31 are vertically spaced apart in a manner such that, in vertical section, a line tangent to the lower portion of any of the tubes 31, which line extends from that lower portion downwardly away from the vapor chambers 24 and forms with the horizontal an angle equal to the static angle of repose of the solids, intersects the adjacent lower tube. By so spacing the tubes, solids are prevented from passing upwardly through the surface defined by the tubes, i. e. from beneath that surface to a position above it by surrounding the tubes.

The topmost tube in the row of tubes 31 is so placed with respect to the skirt 35, which constitutes a part of the solids feeding assembly, that in vertical section, a line passing through the lower end of skirt 35, which line extends from that lower end downwardly away from the vapor spaces 24 and forms an angle with the horizontal equal to the static angle of repose of the solids, intersects that topmost tube.

The tubes 31 constitute a partition having discontinuities adapted to allow passage of gasiform material therethrough while preventing substantial passage of particle-form solids upwardly therethrough.

Between the assembly of tubes 31 and the row of louvers 26, there is a second assembly of substantially horizontal heat transfer tubes 32, the axes of which lie in an inclined plane which forms an angle with the horizontal substantially less than that formed by the inclined plane of the axes of the tubes 31. The tubes 32 are vertically spaced farther apart than the tubes 31. There may be a plurality of such assemblies of tubes between the assembly of tubes 31 and the row of louvers 26.

Although a plurality of openings between louvers 26 have been shown in communication with each vapor chamber 24, it is to be understood that the number of partitions 25 may be increased to the point where there is only one opening between louvers 26 communicating with each vapor space 24.

When the apparatus of Figs. 2 and 3 is used as a regenerator in catalytic conversion the operation is as follows:

Catalyst particles carrying carbonaceous contaminants thereon are introduced into the lower portion of inlet 22 of regenerator 21 through upper portion 36 of inlet 22. As the particles pass as a compact bed through that lower portion bounded by the walls 37 and the walls 38, the compact bed gradually expands in one dimension to the width of vessel 21. The bed then moves downwardly over the louvers 26, the inlet 22 having discharged substantially uniformly, onto the top of the inclined surface of the vapor space, particles having substantially random distribution according to particle size.

As the catalyst moves downwardly over the louvers 26, it is at all times restricted in its path to the space between the row of tubes 31 and the row of louvers 26. The bed is prevented from surrounding the tubes 31 by the fact that, in order to do so, its surface would have to assume an angle less than the angle of repose of the catalyst. Since the bed surface can be prevented from behaving in such a fashion, the row of tubes 31 effectively provides one boundary of the catalyst bed. The louvers 26 are so spaced apart that they provide an opposite boundary of the bed.

A free-oxygen containing gas, for example, air, is introduced into the vapor chambers 24 through inlets 27 at rates controlled by the setting of valves 29 and flows through the spaces between the louvers 26 into the catalyst bed 33, where contact between the air and catalyst occurs under conditions such that combustion of carbonaceous deposits on the catalyst occurs. The gases flow through the bed 33 in a direction substantially perpendicular to the direction of movement of that bed. Gaseous products of combustion disengage from the catalyst bed at the catalyst surfaces between the tubes 31, at the catalyst surface between the topmost tube and skirt 35, and at the catalyst surface between the lowermost tube and the wall of the vessel 21, and are withdrawn through outlet 30. The tubes 31 remove some of the exothermic heat of reaction. The catalyst leaves vessel 21 through outlet 23 at a rate regulated by the setting of valve means not shown.

It is to be noted that, when the solids bed is to be restricted in its path by an assembly of tubes such as the tubes 31 spaced apart as described above, care must be taken that the reactant gas have a velocity through the bed which is low enough that substantial lifting of the catalyst does not occur at the surfaces between the tubes 31.

When, instead of the tubes 31, baffles such as the baffles 10 in Fig. 1 are used, catalyst lifting may be compensated for by increasing the distance which the individual louvers extend above the surface that the catalyst normally assumes when lifting does not occur.

The tubes 32 within the catalyst mass are provided for the purpose of removing the exothermic heat of reaction. When heat transfer to or from the mass of particle-form solids is not needed, tubes 32 may be omitted. The tubes 32 are placed far enough apart that they do not substantially impede the flow of solids through the apparatus. In some cases to be discussed subsequently, it is desirable to use tubes or baffles within the particle bed which do substantially impede the flow of certain portions of the bed.

When the apparatus of Fig. 2 is used for conversion catalyst regeneration, the catalyst close to the louvers 26, which define the under surface of the catalyst bed 33, becomes completely regenerated soonest. Also, the catalyst in the lower portions of the catalyst bed 33 is more completely regenerated than that in the higher portions. Therefore, in the lower portions of the bed 33, the majority of the burning occurs relatively close to the outer row of tubes 31, which define the upper surface of catalyst bed 33; but in the higher portions of the bed 33, the majority of the burning occurs relatively close to the under surface of the bed. The row of tubes 32 is preferably placed in the region of the most vigorous burning. The exact location of this region varies according to the nature of the catalyst and the conditions of the combustion reaction, but in general, since the location of most vigorous burning moves toward the tubes 31 as the catalyst moves downward, the row of tubes 32 is preferably closer to the row of tubes 31 at the bottom than at the top, so that heat is removed near the under surface of the bed in the higher portion, and near the upper surface in the lower portion of the bed.

In view of the manner in which air is contacted with catalyst in regeneration operation according to the invention, and in order to obtain in such operation sufficiently complete combustion of the carbonaceous deposits on the catalyst, it is generally preferred, though not necessary, to preheat the air before introduction into the catalyst bed to a temperature at least approximately as great as the kindling temperature of the carbonaceous deposits on the catalyst, or to at least about 900° F.

In each of the previously illustrated embodiments of the present invention an important feature of each type of apparatus is a partition defining an inclined discontinuous surface through which gasiform materials are introduced into the solids bed. The angle of inclination of this gas-introducing surface is subject to certain limitations. When the partition is constituted by louvers as in Figs. 1 and 2, the angle of inclination of the partition and of the gas-introducing surface will be understood to signify the angle with the horizontal made, in vertical section, by a line passing through the lower edges of the louvers.

The angle which the inclined gas-introducing surface forms with the horizontal must be substantially greater than the static angle of repose of the solid particles, say at least five degrees greater than the static angle of repose. The angle of inclination of the inclined surface must be substantially less than 90°, say less than 85°. A preferred range is 50–75° with the horizontal. Angles less than 50° result in a tendency for certain portions of the solids bed to become relatively stagnant. It is desirable that the angle not exceed 75°, in order that the height of the contacting vessel required for a given capacity may be minimized. A particularly advantageous angle of inclination of the inclined surface is one equal to the apparent angle of repose of the solid particles. Like the static angle of repose, the apparent angle of repose is a property characteristic of a mass of solid particles having a given shape and size, or range of sizes. For a given mass of particles, the apparent angle of repose is always greater than the static angle of repose. Definitions of static and apparent angles of repose are given in a journal article published in the Transactions of the American Institute of Chemical Engineers, volume 41, at page 219 of the issue for April 25, 1945.

As a preferred, but not strictly necessary, additional feature of the apparatus of the invention, there is used a partition defining an inclined discontinuous surface through which gasiform materials are disengaged from the solids bed. The angle with the horizontal of this artificial disengaging surface is substantially greater than the static angle of repose of the solid particles and substantially less than 90°, say less than 85°. It is preferred that this angle be less than 75° and substantially greater than the static angle of repose of the solid particles. Within the above limits, the angles of inclination of gas-introducing surfaces and artificial disengaging surfaces may differ from one another when two such surfaces are used concurrently in a contacting vessel. It is preferred, however, that the angle of the artificial disengaging surface with the horizontal be substantially less than that of the gas-introducing surface. In all cases, it will be understood that both discontinuous surfaces are to be inclined in the same general direction within the allowable limits of angle of inclination; to state this limitation more exactly, the angles of both surfaces with the horizontal are subject to the above limitations and preferred ranges, the angles of both being measured within the same quadrant of the same system of rectangular coordinates.

In Fig. 2, the angles of the gas-introducing and artificial disengaging surfaces are so chosen that the solids bed has greater thickness at its bottom than at its top. It is noted also that such variation in thickness will inevitably occur in apparatus which does not have an artificial disengaging surface, since the bed surface, when it is not artificially confined to a greater angle with the horizontal, naturally assumes the static angle of repose of the solids, and the gas-introducing surface, as previously specified, must have an angle with the horizontal substantially greater than the static angle of repose.

In Fig. 1, however, the angles of the assembly of baffles 10 and the row of louvers 6 are substantially equal, thus causing the solids bed to have substantially uniform thickness throughout its length.

In general, it is preferred that the thickness of the solids bed increase toward its bottom. When the contacting vessel of the invention is used as a catalytic conversion reactor, the increase is of advantage in that the hydrocarbon vapors which are converted in the lower part of the vessel are contacted with catalyst which has been reduced in catalytic activity through accumulation of carbonaceous deposits; those vapors must contact more catalyst to be converted to a given degree than vapors which are converted in the upper part of the vessel.

When the vessel is used as a conversion catalyst regenerator, increase in bed thickness toward the bottom of the vessel is of advantage in that the air which is contacted with partially regenerated catalyst near the bottom of the vessel is not as rapidly used in supporting combustion as that which contacts the more contaminated catalyst above and therefore the former air requires longer time in contact with catalyst for complete utilization.

In Figs. 1 and 2, a plurality of adjacent vapor chambers have been shown, with means for introducing varying amounts of gasiform material into each. Other means for controlling the flow of gasiform materials through different parts of the gas-introducing surface are not excluded from the scope of the invention.

In the operation of the apparatus shown in Fig. 2, it is usually preferable to supply gas at greater pressure to the thicker portions of the bed, where the resistance to the flow of gas is greater, thus preventing a disproportionately large amount of gas from passing through the thinner portions of the bed.

It is to be noted that the partition which defines the inclined gas-introducing surface, though constituted in Figs. 1 and 2 by a row of louvers, which is the preferred construction, may actually be any sort of partition, e. g. a suitably perforated plate, which under the conditions prevailing in the operation, will permit the passage of gasiform material therethrough, while substantially preventing passage of particles downwardly therethrough.

It is generally preferred, when a louvered gas-introducing surface is used, that the solids adjacent that surface follow a path that is relatively straight, and the deviations from which are relatively slight. Therefore, it is preferred that the vertical distance between adjacent louvers be not substantially greater than the length of that part of the upper surface of any given louver which extends outwardly beyond the vertical projection of the adjacent upper louver. Greater relative distances between louvers, however, are within the scope of the invention.

In Fig. 2, heat transfer tubes have been shown within the solids bed, and other heat transfer tubes have been shown forming a boundary of the solids bed. Use of such tubes in either manner is frequently desirable when apparatus according to the invention is used for conducting a strongly endothermic reaction, or a strongly exothermic reaction such as regeneration of conversion catalyst by combustion. Such use may not be necessary, however, even when the reaction is strongly endothermic or exothermic, if the solids are circulated at a high rate, so that the amount of heat generated or absorbed by the reaction per unit time per unit amount of catalyst is small enough that the change in temperature of the solids during passage through the vessel is permissibly slight.

When, for any reason, heat transfer to or from the solids bed is not desired, whereas the use of an artificial disengaging surface is desired, other types of baffling means may be substituted for the tubes 31 in Fig. 2. For example, a row of baffles may be used as shown in Fig. 1. In general, the artificial disengaging surface may be any type of discontinuous surface which is capable of allowing passage of gasiform materials therethrough while preventing substantial passage of solid particles upwardly therethrough. In a catalytic conversion reactor, a disengaging surface comprising baffles is advantageously used in place of a row of heat transfer tubes.

When the angle of inclination of the gas-introducing surface is substantially less than the apparent angle of repose of the solids, there is a tendency for certain portions of the solids bed to become relatively stagnant. Such tendency increases with increasing thickness and length of the bed. Generally, by limiting the thickness and length of the solids bed, it is possible to prevent any substantial stagnation therein, even when the angle of inclination of the gas-introducing surface is substantially less than the apparent angle of repose.

It is also possible by proper positioning of baffles within the solids bed to correct stagnation conditions which tend to occur when the angle of the surface is less than the apparent angle of repose. The baffles are positioned in such a way that particles in the otherwise relatively stagnant regions of the bed are obstructed less by the baffles than are the particles in other regions of the bed. Where heat transfer to or from the solids bed is desirable, heat transfer tubes may be positioned in such a way that they act as baffles, thus serving a double purpose. As previously described with reference to the drawings, heat transfer tubes may be used within the solids bed without acting as baffles or substantially obstructing the flow of any portion of the bed.

It will be recognized that the single or multiple vapor spaces provided within the contacting vessel of the invention may assume a great variety of shapes, the essential feature of the apparatus being the provision of an inclined discontinuous surface over the upper surface of which a solids bed moves by gravity and the lower surface of which is in contact with gasiform material in the vapor space. Therefore, neither the shape nor the number of the vapor spaces, nor the means for supplying gas thereto is critical either to the apparatus of Fig. 1 or to that of Fig. 2.

The foregoing discussion has been directed to gas-introducing surfaces which form, in vertical section, the same angle with the horizontal at all points along their lengths. Such gas-introducing surfaces are preferred, but the invention is not limited thereto. Gas-introducing surfaces having other shapes may be used, the essential provision being that the solid particles adjacent the surface must follow a substantially unbroken path and that, in vertical section, the angle of the surface at any point along its length must conform to the previous specifications as to allowable angles of inclination.

Various important advantages are inherent in the operation of the apparatus above described. One of these advantages resides in the fact that the distribution of particles according to size which occurs in this operation aids rather than hinders uniformity of contact between solid particles and gasiform materials, because, as the bed of solid particles moves over the inclined gas-introducing surface, the particles of relatively small size tend to become concentrated in the part of the bed adjacent to the inclined surface, whereas the relatively larger particles will become concentrated near the upper bed surface. Therefore, the variation of particle sizes will be along the path of the gas stream, rather than perpendicular to that path, the latter being the case in prior art contacting methods where both the gas and the solids travel vertically, and the gas tends to channel through those parts of the horizontal cross-section of the particle bed where the particle size is greater.

In the present invention, substantially no opportunity for channeling is provided. When the solids are fed, as in Fig. 1, from a feed pipe onto the apex of a coaxial conical gas-introducing surface, channeling is avoided, because the feed pipe discharges directly onto the gas-introducing surface, without previous passage of the solids into a relatively expanded region.

When the solids are fed, as in Figs. 2 and 3, along the horizontal length of a plane gas-introducing surface, they must first pass from the relatively constricted feed pipe into the lower portion of inlet 22, which must be expanded in one dimension, that is, along the length of the gas-introducing surface. The structure of inlet 22 is illustrative of means for providing expansion in one dimension without substantial segregation of particles according to size along the expanded dimension. It has been found that a superior structure for this purpose is an enclosed chute having a pair of substantially parallel walls at a uniform angle with the horizontal within the range 45–90°, preferably 45–70°, and a pair of downwardly divergent walls which are substantially perpendicular to the above substantially parallel walls and whose lower ends are on substantially the same horizontal level and which define, with the top and bottom of the structure, i. e. the surfaces perpendicular to the above substantially parallel walls and containing the upper and lower ends respectively of the downwardly divergent walls, a parallelogram whose base angles are within the range 45–85°, preferably 60–80°.

When solid particles move downwardly by gravity as a compact bed from a relatively constricted region into a structure as prescribed above, the distribution of particles according to size along the expanded dimension provided by the downwardly divergent walls is substantially more nearly uniform than the distribution obtained when the particles move downwardly by gravity as a compact bed from a relatively constricted region into the conventional type of structure having two pairs of vertical parallel walls, at least one pair being spaced apart at sufficient distance to provide a relatively expanded region in which the compact bed is allowed to widen.

If the distribution according to size of the particles introduced into relatively constricted portion 36 of inlet 22 is substantially uniform, it has been found that segregation of particles according to size along the length of the gas-introducing surface at the top thereof is minimized and that inlet 22 is therefore capable of discharging substantially uniformly onto the top of the inclined surface of the vapor space, particles having substantially random distribution according to particle size.

Although the above described apparatus is preferred, other means for obtaining substantially random distribution according to particle size when using a plane gas-introducing surface are not excluded from the scope of the invention.

Further advantages which are noted in the process and apparatus of the invention over previous practice in gas-solid contacting are as follows:

The invention can be used in the design of apparatus which will have less overall height than apparatus having the same capacity, but designed for vertical solids flow, rather than inclined solids flow according to the present invention. In general, economy of overall height increases with decreasing angle of inclination of the elongated surface over which the solids pass. In conversion catalyst regenerators with cooling tubes in the catalyst mass according to the invention, additional economies in height result from the fact that cooling takes place in the same zone as the burning, rather than in cooling zones separate from the burning zones.

A second further advantage resides in the fact that when apparatus such as that shown in Figs. 1 and 2 is used for regeneration of contaminated conversion catalyst, the oxygen-containing gas which is used to support combustion of carbonaceous contaminants is required to come in contact with a substantial amount of catalyst before it reaches the external wall of the regenerator. This avoids the "hot wall effect," which not infrequently occurs with previous types of regenerators wherein oxygen-containing gas can reach the external wall without having had its oxygen content substantially reduced by contact with catalyst and can therefore support vigorous combustion at the external wall.

Another advantage of the present invention is that the gasiform materials pass through the solids bed in a direction which is substantially perpendicular to the direction of flow of the solids, and yet introduction to and and disengaging from the solids bed can be achieved for the gasiform material with the use of only one discontinuous surface. This single discontinuous surface is used for introduction of gas, while disengaging may be accomplished at the bed surface which the particles naturally assume.

The prior art has in certain cases, with vertical catalyst flow, achieved substantially perpendicular gas flow by the use of two discontinuous surfaces, one for gas introduction and one for disengaging. If desired, two discontinuous surfaces can be employed with the present invention. When this is done, however, it is not as a matter of strict necessity, as in the case with vertical catalyst flow, but as a means of securing certain additional advantages.

The type of structure illustrated in the drawings, wherein two inclined discontinuous surfaces are used, one for introduction of gas to the bed and one for disengaging, retains the advantages of diagonal catalyst flow over vertical catalyst flow while adding the advantages of providing aditional control over the solids bed thickness and, when the outer discontinuous surface consists of heat transfer tubes, of providing heat transfer means in the region where the product gases have a temperature farthest removed from that of the reactant gases. Thus, in conversion catalyst regeneration, the tubes 31 of Fig. 2 are particularly effective in that they remove heat from the flue gases in the region where those gases are the hottest. The cooling of flue gases as they disengage from the catalyst surface is particularly advantageous in that it helps keep the temperature of the flue gases below the ignition temperature of carbon monoxide and thus prevents additional combustion reaction of carbon monoxide with oxygen in the flue gases.

I claim:

1. Apparatus for regenerating contaminated conversion catalyst which comprises: a contacting vessel; within said contacting vessel and defining an upper boundary of a vapor space therein, an assembly of spaced apart louvers, each angularly disposed in the same direction, the lower edges of said louvers extending outwardly away from said vapor space, said assembly of louvers being inclined at an angle with the horizontal within the range 50–75°, said louvers being so spaced apart that, in vertical section, a line containing the lower edge of one such louver, said line extending from said lower edge downwardly and inwardly toward said vapor space and forming with the horizontal an angle equal to the static angle of repose of said catalyst, intersects an adjacent louver; an assembly of cooling tubes within said contacting vessel and without said vapor space, said cooling tubes being vertically spaced apart in such a way that, in vertical section, a line tangent to any such tube, said line extending downwardly and outwardly away from said vapor space and forming with the horizontal an angle equal to the static angle of repose of said catalylst, intersects the adjacent lower tube, said assembly of tubes being spaced apart from said assembly of louvers and inclined at an angle with the horizontal substantially less than 75° and substantially greater than the static angle of repose of said catalyst, the angle of said assembly of tubes with the horizontal being substantially less than the angle of said assembly of louvers with the horizontal, the angles of both assemblies with the horizontal being measured within the same quadrant of the same system of rectangular coordinates; means for introducing catalyst into the space between said assembly of louvers and said assembly of tubes adjacent the tops thereof to maintain a compact bed of catalyst therebetween; a second assembly of cooling tubes between said assembly of louvers and said first-named assembly of cooling tubes, and inclined at an angle with the horizontal substantially less than the angle of inclination of said first-named assembly of cooling tubes; said vapor space having an inlet for gasiform material; said contacting vessel having a catalyst outlet and an outlet for gasiform material which has passed through said compact bed of catalyst and through said first-named assembly of tubes.

2. Apparatus according to claim 1 wherein said louvers are plane and said cooling tubes are substantially horizontal and wherein said means for introducing catalyst into the space between said assembly of louvers and said assembly of tubes comprise: a closed catalyst chute communicating at the bottom thereof with said space and having a pair of substantially parallel walls at a uniform angle with the horizontal within the range 45–90° and having a pair of downwardly divergent walls, the lower ends of which are on substantially the same horizontal level and which define, with the top and bottom of the chute, a parallelogram whose base angles are within the range 45–85°, said downwardly divergent walls being substantially perpendicular to said substantially parallel walls; and a vertical catalyst conduit communicating at the bottom thereof with the top of said catalyst chute and having cross-sectional dimensions substantially equal to the cross-sectional dimensions of said top of said catalyst chute.

3. The method of regenerating contaminated hydrocarbon oil conversion catalyst which comprises: introducing such catalyst, having substantially random distribution according to particle size, into a contacting zone; passing said catalyst downwardly through said contacting zone as an inclined compact bed extending substantially throughout said contacting zone, the under surface of said compact bed forming a substantially constant angle with the horizontal within the range 50–75; artificially maintaining the upper surface of said compact bed at an angle with the horizontal substantially less than 75° and substantially greater than the static angle of repose of said catalyst; passing free-oxygen containing gas upwardly through said compact bed under combustion conditions in a direction substantially perpendicular to the direction of movement of said compact bed; removing heat from said upper surface of said compact bed; selectively removing heat from the interior of said compact bed near said under surface of said compact bed in the higher portion of said compact bed, and near said upper surface of said compact bed in the lower portion of said compact bed, thereby controlling the bed temperature below a heat damaging level; and removing particle-form solids from said contacting zone directly into a zone free from separately introduced gasiform material.

4. The method of regenerating contaminated hydrocarbon oil conversion catalyst which comprises: passing such catalyst vertically through a relatively constricted zone, wherein said catalyst has substantially random distribution according to particle size, into a second zone which is relatively expanded in one dimension; passing said catalyst downwardly through said second zone as an inclined compact bed having its upper surface inclined at an angle with the horizontal within the range 45–90° and having its under surface inclined at an angle with the horizontal within the range 45–90°, said compact bed gradually laterally expanding as it descends to form an outer bed surface which is inclined at an angle with the horizontal within the range 45–85°; maintaining said second zone full of catalyst; discharging said catalyst from said second zone into a contacting zone; passing said catalyst downwardly through said contacting zone as a second, inclined, compact bed extending substantially throughout said contacting zone, the under surface of said second compact bed forming a substantially constant angle with the horizontal within the range 50–75°; artificially maintaining the upper surface of said second compact bed at an angle with the horizontal substantially less than 75° and substantially greater than the static angle of repose of said catalyst, all angles with the horizontal being measured within the same quadrant of the same system of rectangular coordinates; passing free-oxygen containing gas upwardly through said second compact bed in a direction substantially perpendicular to the direction of movement of said second compact bed; removing heat from said upper surface of said second compact bed; selectively removing heat from the interior of said second compact bed near said under surface of said second compact bed in the higher portion of said second compact bed, and near said upper surface of said second compact bed in the lower portion of said second compact bed, thereby controlling the bed temperature below a heat damaging level; and removing particle-form solids from said contacting zone directly into a zone free from separately introduced gasiform material.

5. Apparatus for effecting intimate contact between gasiform material and particle form solids which comprises: a contacting vessel having a contacting zone extending throughout a major portion of the vertical length thereof; extending substantially throughout the vertical length of said contacting zone, a partition defining an upper boundary of a vapor space therein, above which partition is a space for travel of particle form solids, the angle of inclination of the partition with the horizontal being substantially constant and substantially less than 90° and substantially greater than the static angle of repose of said particles form solids, said partition having discontinuities adapted to allow passage of gasiform material therethrough while preventing substantial passage of particle form solids therethrough; relatively constricted inlet means for introducing particle form solids onto said partition adjacent the top thereof to maintain, in said space for travel of particle form solids, a compact bed of particle form solids, said bed having an inclined upper surface, the lower end of said inlet means being positioned adjacent the top of said partition; said vapor space having an inlet for gasiform material; said contacting vessel having an outlet for particle form solids and, above said inclined upper surface, an outlet for gasiform material.

6. Apparatus according to claim 5 and additionally comprising: a second partition outside said vapor space and spaced laterally apart from the first-named partition and adapted to confine the upper surface of said compact bed, said second partition having discontinuities adapted to allow passage of gasiform material therethrough while preventing substantial passage of particle form solids upwardly therethrough, said second partition being spaced apart from said first-named partition and inclined downwardly away from said first-named partition at an angle with the horizontal substantially less than the angle of said first-named partition and substantially greater than the static angle of repose of said particle form solids.

7. Apparatus according to claim 5 and additionally comprising: a second partition outside said vapor space and spaced laterally apart from the first-named partition and adapted to confine the upper surface of said compact bed, said second partition comprising an assembly of cooling tubes vertically spaced apart in such fashion that in vertical section a line tangent to any such tube on the side of such tube closer to said first-named partition, said line extending downwardly and outwardly away from said vapor space and forming with the horizontal an angle equal to the static angle of repose of said particle form solids, intersects the adjacent lower tube; said second partition being spaced apart from said first-named partition and inclined at an angle with the horizontal substantially less than 90° and substantially greater than the static angle of repose of said particle form solids.

8. Apparatus according to claim 5 wherein said contacting vessel has substantially circular horizontal cross section, wherein said partition has substantially upright conical form and encloses a vapor space therein having upright conical form, and wherein a space for travel of particle form solids surrounds said partition, and wherein said means for introducing particle form solids onto said partition comprise a vertical pipe above and substantially coaxial with said partition.

9. Apparatus according to claim 5 wherein said partition is a plane rectangular partition and wherein said means for introducing particle form solids comprise: a closed catalyst chute communicating at the bottom thereof with said space for travel of particle form solids, said chute having a pair of substantially parallel walls at a uniform angle with the horizontal within the range 45–90° and having a pair of downwardly divergent walls, the lower ends of which are on substantially the same horizontal level and which define, with the top and bottom of the chute, a parallelogram whose base angles are within the range 45–85°, said downwardly divergent walls being substantially perpendicular to said substantially parallel walls; and a vertical catalyst conduit communicating at the bottom thereof with the top of said catalyst chute and having cross-sectional dimensions substantially equal to the cross-sectional dimensions of said top of said catalyst chute.

10. Apparatus according to claim 6 and additionally comprising: an assembly of cooling tubes between said first-named partition and said second partition, said assembly being inclined at an angle with the horizontal substantially less than the angle of inclination of said second partition.

11. The method of effecting intimate contact between gasiform material and particle form solids which comprises: introducing such particle form solids, having substantially random distribution according to particle size, into a contacting zone; passing said particle form solids downwardly through said contacting zone as an inclined compact bed extending substantially throughout the vertical length of said contacting zone, said solids passing progressively farther in a lateral direction as they descend, the under surface of said compact bed forming throughout its vertical length a substantially constant angle with the horizontal, said angle being substantially less than 90° and substantially greater than the static angle of repose of said particle form solids; passing gasiform material upwardly through said under surface of said compact bed and into and through said compact bed in a direction substantially perpendicular to the direction of movement of said compact bed; and removing particle form solids from said contacting zone directly into a zone free from separately introduced gasiform material.

12. Method according to claim 11 wherein the upper surface of said compact bed is maintained at an angle with the horizontal substantially less than the angle of said under surface.

13. Method according to claim 12 wherein said gasiform material is supplied at a greater pressure to the lower portion of said compact bed than to the upper portion of said compact bed.

14. Method according to claim 11 wherein said particle form solids comprise a mixture of solids both substantially larger and substantially smaller than 10 mesh.

15. Method according to claim 11 wherein said particle form solids, prior to introduction into said contacting zone, are passed through an inlet zone, wherein said solids have substantially random distribution according to particle size, as a substantially vertical compact bed having restricted horizontal cross section, wherein said solids are passed directly from said inlet zone into said contacting zone and downwardly therethrough as an annular compact bed having downwardly gradually increasing diameters, said annular compact bed being substantially coaxial with said vertical compact bed, and wherein said gasiform material is passed into the space enclosed by said annular compact bed and thence outwardly and upwardly through said annular compact bed in a direction substantially perpendicular to the direction of movement of said annular compact bed.

16. Method according to claim 11 wherein said particle form solids, prior to introduction into said contacting zone, are passed vertically through a relatively constricted zone, wherein said solids have substantially random distribution according to particle size, into a second zone relatively expanded in one dimension and are passed downwardly therethrough as an inclined compact bed having its upper surface inclined at an angle with the horizontal within the range 45–90° and having its under surface inclined at an angle with the horizontal within the range 45–90°, said compact bed gradually laterally expanding as it descends to form an outer bed surface which is inclined at an angle with the horizontal within the range 45–85°, said second zone being maintained full of catalyst, and wherein said solids are passed downwardly from said second zone into said contacting zone and therethrough as an inclined compact bed having rectangular cross section.

WILLIAM L. McCLURE.

References Cited in the file of this patent

UNITED STATES PATENTS

| Number | Name | Date |
|---|---|---|
| 1,823,895 | Gray | Sept. 22, 1931 |
| 2,289,329 | Prickett | July 7, 1942 |
| 2,311,564 | Munday | Feb. 16, 1943 |
| 2,321,015 | Davis | June 8, 1943 |
| 2,417,393 | Evans | Mar. 11, 1947 |
| 2,429,980 | Allinson | Nov. 4, 1947 |
| 2,440,475 | Jacomini | Apr. 27, 1948 |
| 2,487,795 | Evans | Nov. 15, 1949 |
| 2,488,493 | Evans | Nov. 15, 1949 |
| 2,526,701 | Shirk | Oct. 24, 1950 |
| 2,534,859 | Evans | Dec. 19, 1950 |